United States Patent [19]
Kuhnlein

[11] 3,792,329
[45] Feb. 12, 1974

[54] SPINNING TURBINE HAVING SPEED-CONTROLLED BRAKEABLE ELECTRIC DRIVE MOTOR

[75] Inventor: Hans Kuhnlein, Grossgrundlach, Germany

[73] Assignee: Siemens Aktiengesellschaft, Berlin and Munich, Germany

[22] Filed: Jan. 19, 1972

[21] Appl. No.: 218,957

[30] Foreign Application Priority Data
Feb. 13, 1971 Germany............................ 2106898

[52] U.S. Cl............................... 318/210, 318/373
[51] Int. Cl. ........................................... H02p 3/20
[58] Field of Search... 318/138, 210, 269, 273, 275, 318/300, 373, 374, 439

[56] References Cited
UNITED STATES PATENTS

| 2,589,279 | 3/1952 | Noodleman.......................... 318/210 |
| 3,582,739 | 6/1971 | Daab et al. .......................... 318/275 |
| 2,886,756 | 5/1959 | Schaefer............................. 318/210 |

*Primary Examiner*—Bernard A. Gilheany
*Assistant Examiner*—W. E. Duncanson, Jr.
*Attorney, Agent, or Firm*—Herbert L. Lerner

[57] ABSTRACT

A spinning turbine has a speed-controlled brakeable electric drive motor. The drive motor is a commutatorless DC motor, the stator field of which can be reversed for braking. After the stator field is reversed, the stator current is turned off after a given speed is reached. The spinning turbine of the invention is used for the "open-end" spinning process.

6 Claims, 3 Drawing Figures

3,792,329

SPINNING TURBINE HAVING SPEED-CONTROLLED BRAKEABLE ELECTRIC DRIVE MOTOR

The present invention relates to a spinning turbine. More particularly, the invention relates to a spinning turbine with a brakeable speed-controlled electric drive motor.

Spinning turbines of this type rotate at speeds of 40,000 rpm and higher, and the speed must be controllable at least within a given range. These requirements cannot be met by known drive motors such as DC commutator motors or asynchronous motors at economically justifiable cost.

Although DC commutator motors can be controlled in speed in a simple manner, considerable difficulties are encountered in feeding the current via a commutator because of the high speed. The high speed causes considerable arcing at the brushes, whereby the brushes are subjected, in addition to the wear due to mechanical friction, to additional wear due to the arcing, so that their useful life is considerably reduced. Furthermore, the individual segments of the commutator are also attached by arcing of the brush. Arc base points develop and cause roughening of the surface of the commutator segments. Furthermore, at the aforementioned high speeds, a slight eccentricity of the commutator may lead to a lifting of the brushes. Such a motor therefore requires a considerable maintenance effort.

Although the problems caused by the commutator of the DC motor do not occur in an asynchronous motor, considerable expenditure is required for its speed control. In order to be able to control the speed of an asynchronous motor, the frequency of the supply voltage must be changed. This means that in individual drives a frequency converter would have to be associated with each asynchronous motor.

After a filament break, the spinning cup or bucket of the spinning turbine must be cleaned in the open-end or OE spinning process before spinning may be resumed. In order to be able to remove the residue from the spinning cup by suction, the spinning turbine must be stopped. The economy of the spinning turbine therefore depends upon how fast the spinning cup can be cleaned and the spinning process continued after a filament break. Mechanical braking devices have therefore been provided for braking the spinning turbines. Besides a considerable space requirement, such braking devices also have technical drawbacks. They are, for example, subject to heavy wear, whereby the balanced condition is altered after a short period of operation so that, at high speed, vibrations result which subject the spinning turbines to additional mechanical stress.

It is an object of the invention to provide a spinning turbine of the aforedescribed type having a drive motor which requires little maintenance and little effort for speed control and which may be braked without a mechnical braking device.

Another object of the invention is to provide a spinning turbine of the aforedescribed type which overcomes the disadvantages of known types of spinning turbines and functions with efficiency, effectiveness and reliability.

In accordance with the invention, it is possible to solve the problem by providing as the drive motor a commutatorless DC motor, whose stator field can be reversed in a reversed current circuit for the purpose of braking the spinning turbine and whose stator circuit is automatically shut off after braking to a given speed of rotation in dependence upon a speed-dependent control circuit.

In accordance with a further embodiment of the invention, the DC motor of the spinning turbine has a stator winding having four partial winding branches which are mutually displaced electrically by 90° and are Y-connected at one end and are connected at such end to a first terminal of a DC voltage source. Each of the partial winding branches is connected at the other end via the collector-emitter path of a corresponding one of a plurality of power transistors to a second terminal of the DC voltage source. The two power transistors corresponding to two partial winding branches displaced electrically by 180° are respectively in control connection, via corresponding first and second input transistors, with a Hall effect generator associated with the respective partial winding branches. The base electrode of a corresponding first input transistor and the base electrode of a corresponding second input transistor are connected to each Hall voltage electrode of each Hall effect generator. The collector electrode of a first input transistor and the collector electrode of a second input transistor connected to the Hall voltage electrode other than that to which the first input transistor is connected are connected to the base electrode of the power transistor associated with the first input transistor and are connected via a first collector resistor to the second terminal of the DC voltage source. The emitter electrodes of the first input transistors are connected to a common first connecting line and the emitter electrodes of the second input transistors are connected to a common second connecting line. The first and second connecting lines may be selectively connected to the collector electrode of a control transistor whose emitter and base electrodes are connected to the first terminal of the DC voltage source via a first emitter resistor and a first base resistor and whose base electrode is further connected to the output of a speed control and is connected to the output of the speed-dependent control member when the stator field is reversed.

The speed-dependent control member may comprise, for example, a tachometer generator followed by a voltage-responsive relay. The disadvantage of such apparatus, such as the large space required and mechanically moved parts, may be avoided, however, if the speed-dependent control member comprises a disconnect transistor having a collector electrode connected to the second terminal of the DC voltage source via a second collector resistor and which may also be connected, when the stator field is reversed, to the base electrode of the control transistor, an emitter electrode directly connected to the first terminal and a base electrode connected to the second terminal of the DC voltage source via a second base resistor. The base electrode of the disconnect transistor is connected to the common junction point of one electrode of each of two pairs of coupling diodes. The other electrode of each coupling diode is connected to the end of a corresponding one of the partial winding branches connected to the associated power transistor.

The first and second connecting lines are advantageously connected by a double-throw contact member of a relay to the collector electrode of the control transistor. The control device which operates in dependence upon the speed of rotation is energized by a second contact member of the same relay.

The adjustment range of the speed-dependent control member may be extended by connecting the base electrode of the disconnect transistor to the first terminal of the DC voltage source via a capacitor.

In order that the invention may be readily carried into effect, it will now be described with reference to the accompanying drawings, wherein.

Figure 1:
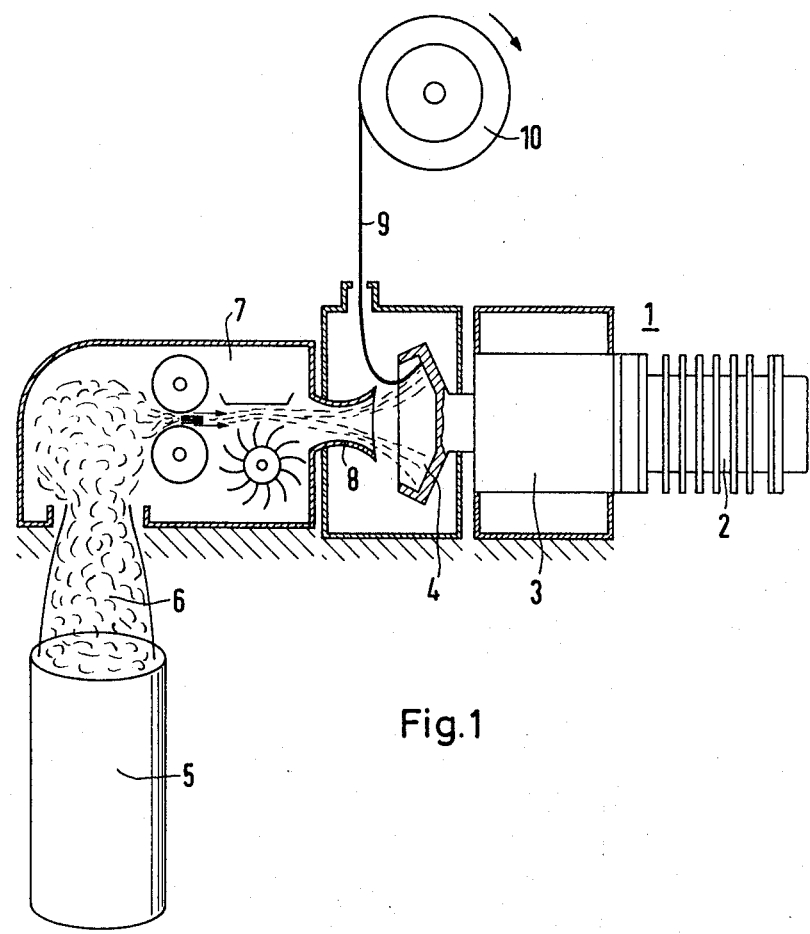
FIG. 1 is a schematic diagram, partly in section, of an embodiment of the spinning turbine of the invention having a feed device for the material to be spun.

In FIG. 1, a spinning turbine 1 comprises a commutatorless DC motor 2, a bearing housing 3 containing the bearings for the turbine shaft and a spinning cup or bucket 4 mounted on one end of the turbine shaft. The material 6 to be spun is contained in a supply tank 5 and is fed via a feed device 7 to an ejector nozzle 8, from which it is supplied to the spinning cup or bucket 4. The spun filament 9 is pulled off the spinning cup or bucket 4 by a take-up device 10.

Figure 2:
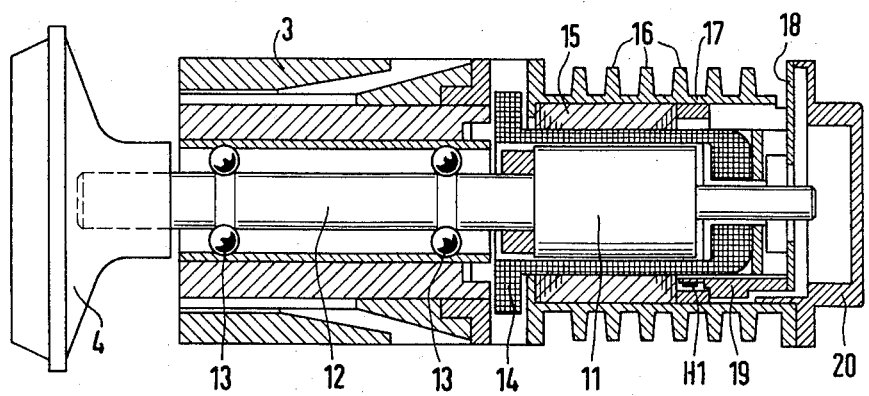
FIG. 2 is a schematic diagram, partly in section, of an embodiment of the spinning turbine of the invention.

In the spinning turbine 1, shown in cross-section in FIG. 2, the commutatorless DC motor 2 has a permanent magnet rotor 11 mounted directly on a turbine shaft 12. The turbine shaft 12 is supported in the bearing housing 3 by a dual ball bearing 13. The spinning cup 4 is mounted on the end of the turbine shaft 12 that faces away from the DC motor. The commutatorless DC motor has a stator winding 14 surrounded by a stack of laminations 15 which provide the return path for the stator and rotor field. The lamination stack 15 and the stator winding 14 are inserted into a motor housing 17 having cooling fins 16. The housing 17 is connected to the bearing housing 3.

A terminal plate 18 is affixed to the side of the motor housing 17 facing away from the bearing housing 3. The current and control terminals of the DC motor are mounted on the outside of the terminal plate 18. A first Hall effect generator support 19 is provided on the inside of the terminal plate 18. A first Hall effect generator H1 is mounted on the free end of the support 19 protruding beyond the permanent magnet rotor 11. A second Hall effect generator support (not shown in FIG. 2) having a second Hall effect generator H2 (not shown in FIG. 2) mounted thereon is affixed to the terminal plate 18. The second support is electrically displaced 90° relative to the first Hall effect generator support 19. A cover 20 is placed on the terminal plate 18 as protection against accidental contact.

Figure 3:
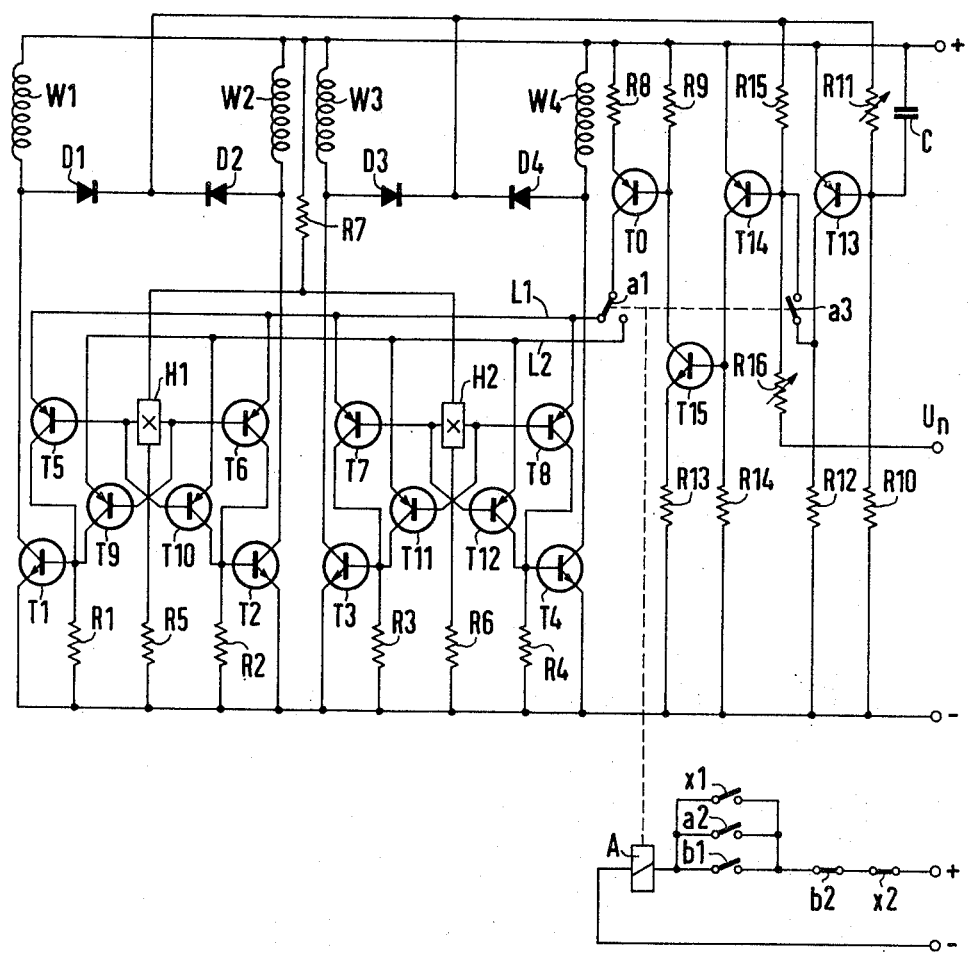
FIG. 3 is a circuit diagram of an embodiment of a commutatorless DC motor for the spinning turbine of the invention.

FIG. 3 shows an electric circuit diagram of the commutatorless DC motor 2. The stator winding comprises four partial winding branches W1 to W4, which are mutually displaced electrically by 90° and are Y-connected at one end and are connected to the positive polarity or first terminal of a DC voltage source. The other end of each of the partial winding branches W1 to W4 is connected in series with a corresponding one of a plurality of power transistors T1 to T4. The emitter electrodes of the power transistors T1 to T4 are connected to the negative polarity or second terminal of the DC voltage source.

The power transistors T1 to T4 are controlled via a plurality of first input transistors T5 to T8. To accomplish this, the base electrodes of two first input transistors T5 and T6 are connected to the Hall voltage electrodes of a Hall effect generator H1 and the base electrodes of the other two first input transistors T7 and T8 are connected to the Hall voltage electrodes of a second Hall effect generator H2. A control current electrode of the first Hall effect generator is connected to the negative polarity terminal of the DC voltage source via a resistor R5. A corresponding control current electrode of the second Hall effect generator is connected to the negative polarity terminal of the DC voltage source via a resistor R6. The other control current electrodes of the Hall effect generators H1 and H2 are connected to the positive polarity terminal of the DC voltage source via a common resistor R7.

The first input transistors T5 to T8 are energized by the Hall effect generators H1 and H2 as a function of the position of the permanent magnet rotor 11. The collector electrode of each of the first input transistors T5 to T8 is connected directly to the base electrode of a corresponding one of the power transistors T1 to T4 and is connected via a corresponding one of first collector resistors R1 to R4 to the negative polarity terminal of the DC voltage source. The emitter electrodes of the first input transistors T5 to T8 are connected to a first connecting line L1.

In addition to the first input transistors T5 to T8, the base electrodes of second input transistors T9 and T10 are connected to the Hall voltage electrodes of the Hall effect generator H1 and the base electrodes of second input transistors T11 and T12 are connected to the Hall voltage electrodes of the Hall effect generator H2. The collector electrode of each of the second input transistors T9 to T12 is also connected to the base electrode of a corresponding one of the power transistors and is connected via a corresponding one of the first collector resistors R1 to R4 to the negative polarity terminal of the DC voltage source. The second input transistors T9 to T12 are connected to the power transistors T1 to T4 so that the second input transistor which is connected to the other Hall voltage electrode than that to which the first input transistor of the same Hall voltage generator is connected is always connected to the same power transistor.

Thus, for example, the first input transistor T5 which is connected to the one Hall voltage electrode of the Hall effect generator H1, and the second input transistor T9 which is connected to the other Hall voltage electrode of the Hall effect generator H1 are connected to the power transistor T1. Similarly, the other first and second input transistors are connected to corresponding ones of the other power transistors. The emitter electrodes of the second input transistors are connected to a second connecting line L2.

The first and second connecting lines L1 and L2 may be selectively connected to the collector electrode of a control transistor T0 via a double-throw contact arm or member a1 of a relay A. The connecting lines L1 and L2 are then connected to the positive polarity terminal of the DC voltage source via the collector-emitter path of the control transistor T0 and an emitter resistor R8.

The base electrode of the control transistor T0 is connected via a first base resistor R9 to the positive polarity terminal of the DC voltage source and is directly connected to the collector electrode of an inverter transistor T15. The emitter electrode of the inverter transistor T15 is connected to the negative polarity terminal of the DC voltage source via a first emitter resistor R13. The base electrode of the inverter transistor T15 is connected to the collector electrode of a regulating transistor T14. The collector electrode of the regulating transistor T14 is connected via a third collector resistor R14 to the negative polarity terminal of the DC voltage source. The emitter electrode of the regulating transistor T14 is connected to the positive polarity terminal of the DC voltage source. The base electrode of the regulating transistor T14 is connected in common to the junction points of the cathodes of coupling diodes D1 to D4 via a resistor R15 and is connected via an adjustable or variable setting resistor R16 to a reference voltage source $U_n$. The regulating transistor R14, the inverter transistor T15, the first emitter resistor T14, the third collector resistor R14 and the setting resistor R16 together form a speed control circuit.

A disconnect transistor T13 has a collector electrode connected to the base electrode of the regulating transistor T14 via another contact arm or member $a3$ of the relay A. The collector electrode of the disconnect transistor T13 is also connected via a second collector resistor R12 to the negative polarity terminal of the DC voltage source. The base electrode of the disconnect transistor T13 is connected via a second base resistor R10 to the negative polarity terminal, is also connected via a capacitor C to the positive polarity terminal of the DC voltage source, and is also connected via a third base resistor R11, which is practically variable or adjustable, to the common junction points of the cathodes of the coupling diodes D1 to D4. The anode of each of the coupling diodes D1 to D4 is connected to a corresponding one of the partial winding branches W1 to W4 at the end of the partial winding branch which is connected to the associated power transistor. The emitter electrode of the disconnect transistor T13 is directly connected to the positive polarity terminal of the DC voltage source.

The relay A may be deenergized or energized, respectively, by a make contact $b1$ and a break contact $b2$, which may be operated manually, and the double-throw contact member or arm $a1$ and the additional contact member or arm $a3$ may thereby be operated. A self-locking contact arm or member $a2$ is connected across the make contact $b1$. An additional make contact $x1$ is connected in parallel with the self-locking contact member $a2$ and the make contact $b1$. An additional break contact $x2$ is connected in series with the make contact $b1$ and the break contact $b2$.

The additional break and make contacts $x2$ and $x1$ may be controlled, for example, by a filament monitoring device, so that the relay A is energized automatically in the event of a filament break, and after correction of the fault the relay is automatically deenergized again by the filament monitoring device. In order to avoid the drawbacks of mechanical contact members, electronic switching elements such as, for example, transistors, may advantageously also be used in lieu of the contact arms or members $a1$ and $a3$. In such case, the relay A is also replaced by an electronic control device.

The drive of the spinning turbine operates as follows. If the DC voltage is applied, by the operation of a switch, for example, the control transistor T0 is first switched ON via the regulating transistor T14 and the inverter transistor T15. In the normal position shown, the emitter electrodes of the first input transistors T5 to T8 are therefore connected to the positive polarity terminal of the DC voltage source via the double-throw contact member $a1$ and the collector-emitter path of the control transistor T0. Corresponding to the position of the permanent magnet rotor 11, one of the first input transistors T5 to T8 is turned ON via one of the Hall effect generators H1 and H2 and the corresponding power transistor T1 to T4 is turned ON via said one of said first input transistors. It is assumed that the first input transistor T5 is turned ON via the Hall effect generator H1. The partial winding branch W1 is thereby connected to the source of DC voltage via the power transistor T1, and a current flows in said winding branch, so that the permanent magnet rotor 11 begins to rotate. Subsequently, voltage is applied to the other partial winding branches W2 to W4 via their associated power transistors. The partial winding branches are energized one after the other in the order W1, W3, W2, W4.

With increasing speed of rotation, the EMF induced in the partial winding branches, which is proportional to the speed of rotation, increases and is taken off by the coupling diodes and fed to the base electrode of the regulating transistor T14. A comparison with the reference voltage applied via the variable setting resistor R16 is made at the base electrode of the regulating transistor T14 and said regulating transistor T14 is controlled according to the deviation between the actual value and the preset value. The regulating transistor T14 in turn controls the control transistor T0 via the inverter transistor T15, so that the speed is always regulated to the preset value.

The disconnect transistor T13 is ineffective in the normal position shown, since the connection between the base electrode of the regulating transistor T14 and the collector electrode of the disconnect transistor T13 is interrupted by the additional contact member $a3$.

If in the event of a fault the relay A is energized by operation of the make contact $b1$ or the additional make contact $x1$, the second connecting line L2 is connected to the collector electrode of the control transistor T0 via the double-throw contact member $a1$. As a result, the power transistors T1 to T4 are switched ON by the second input transistors T9 to T12. Since the second input transistor of each of the power transistors T1 to T4 is connected to the Hall voltage electrode other than that of its first input transistor, the clock frequency imparted by the second input transistors for the power transistors is shifted electrically by 180° relative to that imparted by the first input transistors. This means that if according to the position of the permanent magnet rotor 11 the partial winding branch W1 is energized via the power transistor T1, not this partial winding branch but the partial winding branch W2, electrically shifted 180°, is energized via the power transistor T2 controlled by the second input transistor T10. Since the stator current therefore flows in the partial winding branch W2, which is electrically displaced by 180°, a counter-torque is produced by which the permanent magnet rotor 11 is braked accordingly.

During the braking, the stator current therefore always flows in that partial winding branch from which the speed-proportional EMF is normally derived. The voltage drop produced by the stator current in the partial winding branch leads to a falsification of the derived EMF, which therefore is no longer proportional to the speed of rotation. Despite this, it is possible to provide a simple control with the disconnect transistor T13, since from the moment that the voltage drop in a partial winding branch is greater than the EMF, which becomes smaller due to the decreasing speed, said EMF is derived from the two partial winding branches which are electrically 90° ahead of and after the partial winding branch through which the stator current flows. Since these partial winding branches are open-circuited, a speed-proportional quantity is again available for controlling the disconnect transistor T13.

Furthermore, the spinning turbine need not come to rest exactly in order to remove the dirt residue from the spinning cup by suction before the spinning is resumed. It is sufficient if the speed is reduced so far that the centrifugal force pushing the residue against the wall of the spinning cup becomes smaller than the suction force. A separate monitoring device which would switch OFF or deenergize the motor shortly before or at the point that the speed goes through zero may therefore be omitted. The capacitor C, which is connected between the base electrode of the disconnect transistor T13 and the positive polarity terminal of the DC voltage source, permits the corresponding extension of the range of adjustment of the disconnect transistor T13 so that the stator circuit may be deenergized at the desired speed.

The instant of disconnecting is adjusted by the third base resistor R11. When the desired speed is reached, the disconnect transistor T13 is fully turned ON. Since the additional contact member a3 is switched ON when the relay A is switched ON or energized, the collector electrode of the disconnect transistor T13 is connected to the base electrode of the regulating transistor T14. Thus, when the disconnect transistor T13 is fully turned ON, the potential of the positive polarity terminal of the DC voltage source reaches the base electrode of the regulating transistor T14 via the collector-emitter path of said disconnect transistor, thereby turning said regulating transistor OFF. The control transistor T0 is thereby also switched OFF via the inverter transistor T15, and the stator current is disconnected.

In the spinning turbine of the invention, the disadvantages of a mechanical braking device are avoided by the reversed current braking. Because of the great braking force and the full effectiveness of the counter-torque up to the instant of disconnecting the stator current, the braking time, and therefore also the lost time, is shortened substantially.

While the invention has been described by means of a specific example and in a specific embodiment, it should not be limited thereto, for obvious modifications will occur to those skilled in the art without departing from the spirit and scope of the invention.

I claim:

1. A brakeable speed-controlled electric drive motor for a spinning turbine comprising a commutatorless DC motor having a rotor, a stator, a stator field, a reversed-current circuit for reversing the stator field of the motor for braking a spinning turbine, a stator circuit including control means dependent upon the rotor speed for automatically deenergizing the stator circuit after braking to a given speed of rotation, a DC voltage source having a first terminal of one polarity and a second terminal of the opposite polarity and wherein the stator has a stator winding having four partial winding branches mutually displaced electrically by 90° Y-connected at one end thereof and connected at the one end thereof to the first terminal of the DC voltage source, and the stator circuit comprises a plurality of power transistors having emitter, collector and base electrodes and collector-emitter paths, the other end of each of the partial winding branches being connected to the second terminal of the DC voltage source via the collector-emitter path of a corresponding one of the power transistors, a plurality of first input transistors having emitter, collector and base electrodes, a plurality of second input transistors having emitter, collector and base electrodes, first and second Hall effect generators having Hall voltage electrodes and control current electrodes, and a plurality of first collector resistors, the partial winding branches of each pair of winding branches being displaced electrically by 180° and the corresponding power transistors of the partial winding branches being in control connection with a corresponding one of the Hall effect generators via corresponding first and second input transistors, each Hall voltage electrode of each Hall effect generator being connected to the base electrode of a corresponding one of the first input transistors and to the base electrode of a corresponding one of the second input transistors, the collector electrode of each first input transistor and the collector electrode of each corresponding second input transistor connected to the Hall voltage electrode of the corresponding Hall effect generator other than that to which the first input transistor is connected being connected to the base electrode of the power transistor connected to the corresponding one of the partial winding branches and being connected to the second terminal of the DC voltage source via a corresponding one of the first collector resistors, a common first connecting line connected to the emitter electrodes of the first input transistors, a common second connecting line connected to the emitter electrodes of the second input transistors, a control transistor having emitter, collector and base electrodes, a first emitter resistor, a first base resistor, switch means selectively connecting the first and second connecting lines to the collector electrode of the control transistor, the emitter electrode of the control transistor being connected to the first terminal of the DC voltage source via the first emitter resistor and the base electrode of the control transistor being connected to the first terminal of the DC voltage source, speed control means having an output connected to the base electrode of the control transistor, and rotor speed-dependent control means having an output connected to the base electrode of the control transistor when the stator field is reversed.

2. A brakeable speed-controlled electric drive motor as claimed in claim 1, wherein the rotor speed-dependent control means comprises a disconnect transistor having emitter, collector and base electrodes, a second collector resistor, a second base resistor, the collector electrode of the disconnect transistor being connected to the second terminal of the DC voltage source via the second collector resistor and to the base electrode of the control transistor when the stator field is reversed, the emitter electrode of the disconnect transistor being directly connected to the first terminal of the DC voltage source and the base electrode of the disconnect transistor being connected to the second terminal of the DC voltage source via the second base resistor, a third base resistor, and a plurality of coupling diodes each having a corresponding electrode connected to a corresponding end of a corresponding one of the partial winding branches which end is connected to the corresponding power transistor, the other electrode of each diode of each pair of the diodes being connected to that of the other and the base electrode of the disconnect transistor being connected to a common point in the connection of the other electrode of each diode of each pair of diodes via the third base resistor.

3. A brakeable speed-controlled electric drive motor as claimed in claim 2, wherein the stator circuit further comprises a capacitor, the base electrode of the disconnect transistor being connected to the first terminal of the DC voltage source via the capacitor.

4. A brakeable speed-controlled electric drive motor as claimed in claim 1, wherein the switch means of the stator circuit comprises a relay having a double-throw contact member having one end connected to the collector electrode of the control transistor and another end selectively connectable to the first and second connecting lines and a second contact member connected to the rotor speed-dependent control means for selectively energizing said rotor speed-dependent control means.

5. In a brakeable, speed-controlled, and commutatorless DC drive motor for a spinning turbine, a rotor, a stator, and a stator winding having a plurality of partial winding branches Y-connected at one end thereof and connectible at said one end to a first terminal of a DC voltage source, a plurality of power transistors having emitter, collector and base electrodes and collector-emitter paths, each of said partial winding branches being connected at the other end thereof through the collector-emitter path of one of said plurality of power transistors, respectively, to a second terminal of the DC voltage source, a plurality of Hall effect generators respectively associated with the partial winding branches of said stator winding for establishing the position of the rotor relative to the stator, each of said Hall effect generators having a pair of Hall voltage electrodes, first and second input transistors having respective base, emitter and collector electrodes, one of said first and one of said second input transistors being operatively associated with each of said power transistors and controllably connected to said Hall effect generators, the base electrode, respectively, of one of said first and one of said second input transistors being connected to each one of the pair of Hall voltage electrodes of said Hall effect generators, the emitter electrodes of all of said first input transistors being connected to a common first connecting line, and the emitter electrodes of all of said second input transistors being connected to a common second connecting line, a control transistor having a collector, an emitter and a base electrode, said first and said second connecting lines being selectively connectible to said collector electrode of said control transistor, a first emitter resistance and a first base resistance, said emitter and said base electrode of said control transistor being connectible through said first emitter resistance and said first base resistance to the first terminal of the DC voltage source, a speed control device and a speed-dependent control member, each having a respective output, said base electrode of said control transistor being further connected to said output of said speed control and, upon reversal of the stator field, being connected to said output of said speed-dependent control member.

6. Drive motor for a spinning turbine according to claim 5 wherein said stator winding has four partial winding branches mutually displaced electrically by 90°, the partial winding branches of respective pairs of said partial winding branches being displaced electrically by 180° and the respective power transistors of said partial winding branches being in control connection with one of said Hall effect generators common to a respective pair of said partial winding branches, through a respective first and second input transistor, the base electrode of respective first input transistor and a respective second input transistor being connected to each Hall voltage electrode of each Hall effect generator, the collector electrode of each first input transistor and the collector electrode of each corresponding second input transistor, connected to the Hall voltage electrode of the corresponding Hall effect generator other than that to which the first input transistor is connected, being connected to the base electrode of the power transistor connected to the corresponding one of the partial winding branches and being connectible to the second terminal of the DC voltage source through a first collector resistance.

* * * * *